United States Patent [19]

Boba et al.

[11] 4,361,626

[45] Nov. 30, 1982

[54] METHODS FOR BONDING DISSIMILAR SYNTHETIC POLYMERIC MATERIALS AND THE PRODUCTS INVOLVED IN AND RESULTING FROM SUCH METHODS

[75] Inventors: Joseph Boba, Fort Lee, N.J.; Seevaram N. Varadhachary; Vincent F. Pogozelski, both of Newtown, Pa.

[73] Assignee: Congoleum Corporation, Kearny, N.J.

[21] Appl. No.: 184,829

[22] Filed: Sep. 8, 1980

[51] Int. Cl.$^3$ .................. B32B 7/04; B32B 31/04; B32B 27/40; B32B 77/30

[52] U.S. Cl. .................. 428/420; 204/159.16; 204/159.19; 427/54.1; 427/302; 427/333; 427/372.2; 428/423.3; 428/424.4; 428/424.6; 428/424.8; 428/522

[58] Field of Search .................. 428/424.6, 424.4, 420, 428/424.8, 423.3, 522; 427/333, 302, 54.1, 372.2; 156/78, 79; 204/159.16, 159.19

[56] References Cited

U.S. PATENT DOCUMENTS

| | | | |
|---|---|---|---|
| 3,528,848 | 9/1970 | Zoebelein | 428/424.4 |
| 3,877,969 | 4/1975 | Tatsumi | 428/424.4 |
| 4,100,318 | 7/1978 | McCann | 427/333 |
| 4,232,608 | 11/1980 | Wrightson | 428/420 |

FOREIGN PATENT DOCUMENTS 51-20981 2/1976 Japan .................. 428/424.4

*Primary Examiner*—Ellis P. Robinson
*Attorney, Agent, or Firm*—Richard T. Laughlin

[57] ABSTRACT

A method of improving the bond between dissimilar synthetic polymeric materials, such as, for example, a vinyl resin material and a polyurethane or acrylated polyurethane resin material which comprises: including in the vinyl resin material a chemical compound possessing hydroxy, carboxy, amido, amino, imino, mercapto, or like functions containing reactive hydrogen; providing free, available isocyanate in the polyurethane or acrylated polyurethane resin material; bringing the vinyl resin material and the polyurethane or acrylated polyurethane resin material into contact; and exposing the vinyl resin material and the polyurethane, or acrylated polyurethane resin material, while in contact, to curing conditions, whereby there is sufficient chemical inter-reaction between these resin materials as to create a strong and permanent primary chemical bond therebetween, in addition to any secondary bonds, such as hydrogen bonds and/or van der Waals forces. The present invention also relates to the products involved in and resulting from such methods.

23 Claims, No Drawings

METHODS FOR BONDING DISSIMILAR SYNTHETIC POLYMERIC MATERIALS AND THE PRODUCTS INVOLVED IN AND RESULTING FROM SUCH METHODS

THE FIELD OF THE INVENTION

The present invention relates to methods of making multi-layered products, and more particularly multi-layered sheet materials, such as resilient floor coverings, which comprise a vinyl resin layer and a polyurethane or acrylated polyurethane resin layer, wherein it is necessary that such layers be adhered together in a strong and permanent bond which resists delamination very well.

BACKGROUND OF THE INVENTION

This application relates to our U.S. application Ser. No. 023,107, filed Mar. 23, 1979 and now abandoned.

It is well known in the manufacture of multi-layered products, such as resilient floor, wall or ceiling coverings, or resilient desk, table or counter tops, and the like, that it is often necessary to bond together two or more layers of dissimilar synthetic polymeric materials and that it is often difficult to obtain a strong and permanent bond between such dissimilar synthetic materials.

Such difficulties often are believed to arise in the bonding of such dissimilar synthetic polymeric materials because of the differences in surface energies. For example, if atoms from two dissimilar synthetic polymeric materials cannot get close enough to each other, perhaps because of large dissimilarities or disparities in polarity, van der Waals forces cannot be adequately taken advantage of to create strong permanent bonding. Nor is it believed that hydrogen bonding can be adequately taken advantage of in such situations. Many proposals have been made to overcome such difficulties and to improve the bond between such dissimilar synthetic polymeric materials but none has been found to be completely satisfactory to date.

The present invention will be described with particular reference to the bonding of dissimilar synthetic polymeric materials, such as, for example, vinyl resins and polyurethane or acrylated polyurethane resins but it is to be appreciated that the principles of the present invention are equally applicable to other equivalent synthetic polymeric materials. In the same way, the present invention will be described with specific reference to multi-layered products, such as, for example, resilient floor coverings utilizing dissimilar synthetic polymeric materials but again, it is to be appreciated that the principles of the present invention are equally applicable to other multi-layered products which also utilize dissimilar synthetic polymeric materials.

In the manufacture of resilient floor coverings, normally a relatively flat base layer or substrate is laid out in substantially horizontal condition. Such a base layer or substrate is customarily a felted or matted fibrous sheet of overlapping, intertwined fibers and/or filaments, usually of asbestos or of natural, synthetic or man-made cellulosic origin, although many other forms of sheets and films or textile materials or fabrics may be used.

Upon this substantially flat, horizontal base layer or substrate is then applied a substantially uniform base layer of a liquid or semi-liquid resinous composition which contains a synthetic polymeric material, usually an ungelled polyvinyl chloride plastisol, usually containing a blowing or foaming agent. This liquid or semi-liquid plastisol composition is subsequently gelled at an elevated temperature to a relatively firm condition by procedures which are conventional and well known in the art. This relatively firm, gelled plastisol may then be printed with a decorative, multi-colored pattern or design in which certain predetermined areas contain a blowing or foaming inhibitor which subsequently modifies the action of the blowing or foaming agent in those certain predetermined areas. Several different printing ink compositions may be used.

A substantially uniform wear layer usually of a clear liquid or semi-liquid resinous composition and usually containing another ungelled polyvinyl chloride plastisol composition but generally not containing any blowing or foaming agent is then applied as a wear resistant coating to the surface of the base layer of printed, firmed and gelled polyvinyl chloride plastisol and is subsequently gelled and firmed thereon, either as a separate operation or in a joint operation operation with a subsequent fusing and blowing and foaming operation of the base layer of polyvinyl chloride plastisol. Thus far, there is relatively very little difficulty in creating a strong, permanent bond or adhesion between the base layer of polyvinyl chloride plastisol and the wear layer, which is also a polyvinyl chloride plastisol.

It is then frequently desired to provide a top surface coating to the surface of the polyvinyl chloride wear layer and it is often desired that such top surface coating be a polyurethane or acrylated polyurethane resin, primarily because of their superior physical and chemical properties and characteristics. However, in many instances, it is found that the adhesion or bond between the vinyl resin wear layer and the polyurethane or acrylated polyurethane resin top surface coating is not as strong or as permanent, as desired or required. It is believed that such lack of strength and of permanency or lack of suitable resistence to delamination is due to the fact that the wear layer and the top surface coating are dissimilar synthetic polymeric materials.

PURPOSES AND OBJECTS OF THE INVENTION

It is therefore a principal purpose and object of the present invention to provide for methods of improving the bond between dissimilar synthetic polymeric materials, and particularly between a vinyl resin material and a polyurethane or acrylated polyurethane resin material, whereby a strong, permanent bond created between such materials which will resist delamination very well.

BRIEF SUMMARY OF THE INVENTION

It has been found that such principal purpose and object, as well as other principal purposes and objects which will become clear from a further reading and understanding of this disclosure, may be achieved by forming a layer comprising a vinyl resin, one or more plasticizers for the vinyl resin, and a chemical compound possessing a hydroxy, carboxy, amido, amino, imino, mercapto, or like functions containing reactive hydrogen; providing a polyurethane or acrylated polyurethane resin which contains free, available isocyanate; bringing the vinyl resin layer and the polyurethane or acrylated polyurethane resin into contact; and exposing the vinyl resin layer and the polyurethane or acrylated polyurethane resin, while in contact, to curing conditions, whereby there is sufficient chemical interreaction between the vinyl resin layer and the polyurethane or acrylated polyurethane resin as to provide a strong and permanent bond therebetween, in addition to any secondary bonds such as hydrogen bonds and van der Waals forces, the strong and permanent bonds comprising primary chemical bonds well capable of resisting delamination.

DESCRIPTION OF PREFERRED AND TYPICAL EMBODIMENTS

THE BASE LAYER OR SUBSTRATE

The specific base layer or substrate which is used to illustrate the preferred and typical embodiments of the present invention does not relate to the essence of the inventive concept and no specific or detailed description thereof is deemed necessary. It is customarily and conventionally a felted or matted fibrous sheet of overlapping, intermingled fibers and/or filaments, usually of asbestos or of cellulosic origin, although many other forms of sheet, films, or fabrics, and many other fibers and/or filaments may be used, such as described in Nos. 3,293,094 and 3,293,108 to Nairn et al.

THE BASE SYNTHETIC POLYMERIC LAYER

The specific base synthetic polymeric layer which is used to illustrate the present invention does not relate to the essence thereof and it is sufficient to state that it may be any potentially foamable or non-foamable resinous composition and that, although a plastisol of polyvinyl chloride is preferred and is typical, many other synthetic resins are also of use, not only as plastisols but also as organosols or as aqueous latices.

Typical of the plasticizers which are used in the formation of the preferred and typical polyvinyl chloride plastisols are dioctyl phthalate, butyl benzyl phthalate, dibutyl sebacate, and many others cited in the previously mentioned United States Patents.

THE VINYL RESIN WEAR LAYER

The specific vinyl resin which is used in the preparation of the wear layer does not relate to the essence of the present invention. Although a polyvinyl chloride homopolymer in the form of a plastisol is the preferred and typical embodiment, many other vinyl resins are of use, such as a vinyl chloride-vinyl acetate copolymer, a vinyl chloride-vinylidene chloride copolymer, or copolymers of vinyl chloride with other vinyl esters, such as vinyl butyrate, vinyl propionate, or alkyl substituted vinyl esters, and the like. Other synthetic polymers are also of use.

Substantially any vinyl resin wear layer will suffice, such as those disclosed in the previously cited United States Patents, with the modification that there also be included in the formulation from about 0.5 percent to about 20 percent by weight, and preferably from about 3 percent to about 10 percent by weight, of a chemical compound possessing hydroxy, carboxy, amido, amino, imino, mercapto, or like functions which contain reactive hydrogen, such percentages being based on the total weight of the vinyl resin wear layer formulation.

Specific examples of such chemical compounds containing reactive hydrogen include, as illustrative but not limitative, the following:

Diols such as ethylene glycol, propylene glycol, butylene glycol, trimethylene glycol, tetramethylene glycol, pentamethylene glycol, hexamethylene glycol, neopentyl glycol, etc.; triols such as glycerol, 1,1,1-trimethylol propane, 1,1,1-trimethylol ethane, 1,2,3-butanetriol, 1,2,4-butanetriol, 1,2,3-pentanetriol, 1,2,3-hexanetriol, 1,2,4-hexanetriol, 1,2,5-hexanetriol, 1,2,6-hexanetriol, 2,3,4-hexanetriol, 1,3,6-hexanetriol, etc.; tetrols such as erythritol, pentaerythrotol, etc.; as well as various mixtures of such polyols in varying proportions.

Ether-type polyols which are adduct product of the above polyols with alkylene oxides having from 2 to 5 carbon atoms, such as ethylene oxide, propylene oxide, trimethylene oxide, 1,2-butylene oxide, isobutylene oxide, 1,4-tetramethylene oxide, pentamethylene oxide, and mixtures thereof, and especially diethylene glycol, triethylene glycol, tetraethylene glycol, pentaethylene glycol, and higher molecular weight polyalkylene glycols having the general chemical formulas $HO(C_nH_{2n})_xOH$, etc.

Ester-type polyols which are condensation products of the above polyols with polycarboxylic acids such as oxalic acid, malonic acid, succinic acid, glutaric acid, adipic acid, pimelic acid, suberic acid, azelaic acid, maleic acid, fumaric acid, phthalic acid, isophthalic acid, terephthalic acid, mellitic acid, etc.

Polyamines such as ethylene diamine, propylene diamine, trimethylene diamine, tetramethylene diamine, pentamethylene diamine, hexamethylene diamine, diethylene diamine, triethylene diamine, tetraethylene diamine, tetraethylene pentamine, isophorone diamine, piperazine, etc.

Polymercaptans such as ethylene dimercaptan, 1,3-propanedithiol, 1,4-butanedithiol, 2,2-dimercapto diethylether, glycol dimercapto acetate, glycerol dimercapto propionate, trimethylolpropane, tri-(3-mercapto propionate), etc.

Hydroxyamines such as monoethanolamine, diethanolamine, 3-aminopropanol-1, 4-amino butanol-1, etc.

Hydroxy mercaptans such as 1-thioglycerol, 2-mercapto ethanol, 2,3-dimercapto propanol-1, etc.

It is to be noted that these chemical compounds possess at least two reactive hydrogens and that such reactive hydrogens are attached to different atoms, that is to say that they are attached to different sites.

The vinyl resin wear layer formulation, including one or more plasticizers for the vinyl resin, such as listed previously in the above cited United States Patents, together with fillers, stabilizers, antioxidants, etc., as desired or required, and containing the chemical compounds having the reactive hydrogen is cast or formed on the surface of the base synthetic polymeric gelled and firmed plastisol layer of polyvinyl chloride to a substantially uniform thickness of from about 2 mils to about 30 mils or more. The vinyl resin wear layer is then gelled, either in a separate operation at an elevated temperature of from about 240° F. to about 430° F. for a period of time of from about 1 minute to about 4 minutes, whereby it becomes firm, or combined with a fusion operation, along with the blowing and the foaming operation for the base synthetic polymeric layer at an elevated temperature which is higher than the gelling or firming operation and is in the range of from about 270° F. to about 450° F. for a period of time of from about 2 minutes to about 10 minutes, and preferably from about 3 minutes to about 8 minutes.

THE TOP COATING

The specific polyurethane or acrylated polyurethane resin which is used in the formulation of the top surface coating which is to be applied to or formed on the vinyl resin wear layer does not relate to the essence of the present invention. The polyurethane may be a conventional polyurethane resin, or it may be a modified or acrylated polyurethane resin.

CONVENTIONAL POLYURETHANES

Conventional polyurethane resins are polymerization reaction products of any of the previously listed polyols, polyamines, polymercaptans, etc., with any of the following aliphatic, aromatic, cycloaliphatic, or heterocyclic polyisocyanates:

4,4-methylene-bis-cyclohexyl diisocyanate
  tetramethylene-1,4-diisocyanate
  trimethyl hexamethylene diisocyanate
  trimer of hexamethylene diisocyanate
  2,4-tolylene diisocyanate
  p-phenylene diisocyanate
  4,4'-methylene-bis(phenylisocyanate)
  4,4'-biphenylene diisocyanate
  butane-1,4-diisocyanate
  pentane-1,5-diisocyanate
  hexamethylene-1,6-diisocyanate
  cyclohexane diisocyanate
  dimer acid diisocyanate
  ethylene diisocyanate
  2,6-tolylene diisocyanate
  m-phenylene diisocyanate
  naphthylene-1,5-diisocyanate
  furfurylidene diisocyanate
  isophorone diisocyanate
  xylene diisocyanate In the formulation of the conventional polyurethane resin top coating composition, the proportions of the polyisocyanate and the reacting polyol, polyamine, polymercaptan, etc. must be so selected that there is provided from about 0.5% to about 10% by weight of free available isocyanate, and preferably from about 2% to about 5% by weight, based on the total weight of the polyurethane resin top coating formulation.

Conventional polyurethane resins are normally cured by conventional thermal processing in ovens or other suitable heating apparatus at elevated temperatures of from about 150° F. to about 450° F. and preferably from about 260° F. to about 410° F. for a period of time of from about 1 minute to about 8 minutes, and preferably from about 3 minutes to about 5 minutes.

MODIFIED OR ACRYLATED POLYURETHANES

Modified polyurethanes, such as acrylated polyurethanes, may be prepared by several different methods, one preferred and typical method using three basic components: (1) a UV reactive polymer; (2) a diluent system composed of multifunctional acrylate acrylate esters (and occasionally monofunctional acrylic esters); and (3) a photoiniator system.

The UV reactive polymer may be initially synthesized, for example, from a conventional isocyanate-function terminated polyurethane by reaction with a hydroxyalkyl acrylate to form an essentially polyurethane structure having terminal acrylate functionality. If desired, the hydroxyalkyl acrylate may be replaced by hydroxyalkyl methacrylates, or by other hydroxycontaining vinyl compounds, such as vinyl esters, vinyl ethers, vinyl sulfides, etc., to yield essentially polyurethane structures having terminal methacrylate functionality or vinyl functionality. The acrylate functionality is normally preferred. Examples of preferred or typical hydroxyalkyl acrylates are: hydroxyethyl acrylate, hydroxymethyl acrylate, hydroxypropyl acrylate, etc. Examples of preferred and typical hydroxyalkyl methacrylates are: hydroxyethyl methacrylate, hydroxymethyl methacrylate, hydroxypropyl methacrylate, etc. Examples of other preferred and typical hydroxy-containing vinyl compounds are: B-hydroxyethyl vinyl ether, B-hydroxyethyl vinyl sulfide, etc.

The diluent system is composed of multifunctional acrylate esters (and occasionally monofunctional acrylic esters) such as: pentaerythritol triacrylate, trimethylolpropane triacrylate, 1,6-hexanediol diacrylate, ethylene glycol dimethacrylate, polyethylene glycol (200) dimethacrylate, pentaerythritol tetraacrylate, 1,3-butylene glycol diacrylate, 1,4-butanediol diacrylate, neopentyl glycol diacrylate, etc. If monofunctional monomers are to be included along with the multifunctional compounds, the following illustrative examples of such monomers may be used: methyl acrylate, ethyl acrylate, butyl acrylate, hexyl acrylate, isobutyl acrylate, benzyl acrylate, cyclohexyl acrylate, 2-ethylhexyl acrylate, butoxyethyl acrylate, isodecyl acrylate, glycidyl acrylate, vinyl acetate, etc.

The photoinitiator may be selected from a large group of known photoinitiators of which the following are illustrative but not limitative: benzoin and its alkyl ethers such as methyl or isobutyl ether of benzoin, benzophenone and its derivatives such as 2,4-dihydroxybenzophenone, 2-hydroxy-4-methoxy benzophenone, used singly or in combination with amine compounds such as dimethylaminoethanol, N,N-dimethylaniline, triphenylphosphine, etc., dimethoxyphenyl acetophenone, diethoxy acetophenone, etc., xanthone, thioxanthone, anthraquinone, flavone, benzil, polycyclic aromatic ketones, etc. Such photoinitiators are used in amounts of from about 0.5% to about 20% by weight, and preferably from about 1% to about 5% by weight, based on the total weight of the ultraviolet curable formulation.

The acrylated polyurethane resin top surface coating may be prepared by other conventional methods well known in the art, such as, for example, those methods disclosed in U.S. Pat. No. 4,100,318 but, again, must be so formulated as to possess from about 0.5% to about 10% by weight of free, available isocyanate, and preferably from about 2% to about 5% by weight, based on the total weight of the acrylated polyurethane resin top surface coating formulation. This, of course, is provided for in the original synthesis of the isocyanate-function terminated polyurethane resin by employing an excess of the diisocyanate over the reacting polyol, polyamine, polymercaptan, etc.

Curing conditions for the modified or acrylated polyurethane resins differs from those employed for the more conventional polyurethane resins, in that the modified or acrylated polyurethane resins are cured by passed through an actinic radiation source, such as an ultraviolet lamping unit. Radiation curing by electron beam, gamma and x-ray treatment, and other suitable radiation sources may be employed but must be used at relatively low energy levels, inasmuch as they are essentially examples of very high energy irradiation techniques leading to extremely rapid polymerization. Ultra violet radiation is the preferred and typical source. In the presence of photoinitiators, such radiation sources induce a photochemical reaction which produces free radicals capable of inducing polymerization. Sources of ultraviolet radiation may be mercury vapor arc lamps, plasma arcs, pulsed xenon lamps and carbon arcs. Mercury vapor arc lamps are preferred and typical, preferably at medium pressure rather than high pressure or low pressure. Specific wavelengths of light which are most effective will vary, depending primarily upon the particular polyurethane top coating formulation used and the particular photo-sensitizer employed. It is also to be appreciated that, in some instances, combinations of thermal curing and radiation curing conditions may be used.

During the curing conditions to which the polyurethane or the acrylated polyurethane resins, whether conventional or modified or acrylated, is exposed, there is sufficient chemical interreaction between the reactive hydrogens in the vinyl resin wear layer and the free, available isocyanate in the top surface coating as to create a strong and permanent primary chemical bond between the two layers of dissimilar synthetic polymeric materials. Such, of course, is additional to any existing secondary bonds or forces, such as hydrogen bonds or van der Waals forces.

The present invention will be further described with particular reference to the following specific working examples, wherein there are disclosed preferred and typical embodiments of the present invention. However, it is to be pointed out that such specific examples are primaril illustrative and not limitative of the broader principles of the inventive concept and that other specific materials, chemicals, processes, etc., may be employed without departing from the scope and the spirit of the appended claims.

EXAMPLE I

The base layer or substrate comprises a relatively flat, 0.040 inch thick fibrous sheet of felted, matted asbestos fibers with an acrylic resin smoothing and leveling coating thereon. The asbestos fibrous sheet is coated substantially uniformly to a wet thickness depth of about 0.015 inch with the following foamable polyvinyl chloride plastisol composition as the base synthetic polymeric layer:

|  | Parts |
|---|---|
| Polyvinyl chloride, low mol. wt. general purpose, dispersion resin, inherent viscosity 0.99 (ASTM 1243-66 | 30.2 |
| Polyvinyl chloride, med. mol. wt. dispersion grade, inherent viscosity 1.0 | 8.2 |
| Polyvinyl chloride, med. mol. wt. blending resin, inherent viscosity 0.9 | 17.1 |
| Anhydrous alumina silicate filler | 6.9 |
| Alkyl benzyl phthalate plasticizers | 24.7 |
| Polydodecyl benzene | 7.4 |
| Azodicarbonamide blowing agent | 1.1 |
| Accelerator/stabilizer | 0.4 |
| Titanium dioxide | 2.5 |
| Dioctyl phthalate | 1.5 |
| Wetting agent | 0.03 |
| (parts by weight) | |

Gelling and firming of the potentially foamable ployvinyl chloride plastisol is accomplished in a heated oven atmosphere maintained at an elevated temperature of about 300° F. for a period of time of about 3 minutes. This temperature is not that elevated as to activate or decompose the azodicarbonamide blowing agent in the polyvinyl chloride plastisol base synthetic polymeric layer as to cause blowing or foaming thereof.

The gelled, firmed potentially foamable polyvinyl chloride plastisol is then printed with a multicolored decorative design or pattern, using (1) a conventional or standard printing ink composition and (2) an inhibitor-containing printing ink composition, having the following compositions, respectively:

|  | Parts |
|---|---|
| Solution grade vinyl chloride-vinyl acetate copolymer (90 parts:10 parts) | 15 |
| Methyl ethyl ketone | 85 |
| Pigment or colorant, as needed or required | |
| Solution grade vinyl chloride-vinyl acetate copolymer (90 parts:10 parts) | 12 |
| Methyl ethyl ketone | 68 |
| Trimellitic anhydride blowing inhibitor | 20 |
| Pigment or colorant, as needed or required | |

The printed, gelled, potentially foamable polyvinyl chloride plastisol is then allowed to air-dry and a polyvinyl chloride plastisol wear layer is substantially uniformly applied thereto to a wet thickness depth of about 0.015 inch. The wear layer has the following composition by weight:

|  | Parts |
|---|---|
| Polyvinyl chloride, dispersion grade, high mol. wt. | 89.4 |
| Polyvinyl chloride, blending resin, inh. vis. 0.9 | 10.6 |
| Butyl benzyl phthalate plasticizer | 28.9 |
| 2,2,4-trimethyl-1,3-pentanediol diisobutyrate | 6.9 |
| Plasticizer (S-587) | 9.3 |
| Epoxy plasticizer (G-62) | 5.0 |
| Ba-Zn stabilizer | 7.0 |
| Toner | 0.21 |
| UV absorber | 0.31 |
| Oxyester T 1136 (V) linear polyester with hydroxy groups, hydroxyl value 107 mg. KOH/g., acid value less than 2 mg KOH/g (Veba Chemie AG) | 20.0 |

Gelling and firming of the applied polyvinyl chloride plastisol wear layer takes place at an elevated temperature in a heated oven at about 300° F. for a period of time of about 3 minutes, followed by a fusing of the polyvinyl chloride layers, and a blowing and foaming of the base synthetic polymeric layer at an elevated temperature of about 430° F. for a period of time of about one minute and forty seconds.

The polyvinyl chloride wear layer is then coated substantially uniformly to a wet thickness depth of about 1½ mils with the following acrylated polyurethane top coating composition which contains 1.93% free available NCO.

|  | Parts |
|---|---|
| Acrylated urethane oligomer | 80 |
| Tetraethylene glycol diacrylate | 10 |
| N—vinyl pyrrolidone | 15 |
| To this formulation is added 3% Vicure-10 (isobutyl ether of benzoin) photoinitiator. | |

The curing of the applied polyurethane resin top coating takes place by passage through an ultraviolet unit having a length of about 3 feet (2 lamp parallel unit, 12 inches long, 200 watts each lamp, medium pressure, mercury lamp) and a nitrogen atmosphere at a rate of about 10 feet per minute.

The bond between the vinyl wear layer and the acrylated polyurethane top surface coating is tested and is found to be strong and permanent and capable of resisting delamination very well. Primary chemical bonds exist between the dissimilar synthetic polymeric layers.

EXAMPLE II

The procedures described in Example I are followed substantially as set forth therein with the exception that the Oxyester T 1136 (V) in the wear layer is replaced by 15 parts by weight of Oxyester V 2922 (V), a highly branched polyester with hydroxyl groups, hydroxyl value 275 mg KOH/g and an acid value less than 2 mg KOH/g (Veba Chemie AG). The bond between the vinyl resin wear layer and the acrylated polyurethane top surface coating is tested and is found to be strong and permanent and to resist delamination very well. Primary chemical bonds exist between the dissimilar synthetic polymeric layers.

EXAMPLE III

The procedures described in Example I are followed substantially as set forth therein with the exception that the Oxyester T 1136 (V) in the wear layer is replaced by 20 parts by weight of Oxyester B 926 (V), a hydroxyl-terminated polyester with slightly branched chains, hydroxyl value 91 mg KOH/g, acid value less than 2 mg KOH/g (Veba Chemie AG). The bond between the vinyl resin wear layer and the acrylated polyurethane top surface layer is tested and is found to be strong, permanent and to resist delamination very well. Primary chemical bonds exist between the dissimilar synthetic polymeric layers.

EXAMPLES IV and V

The procedures described in Example I are followed substantially as set forth therein with the exception that the amount of Oxyester T 1136 (V) is: increased from 20 parts to 25 parts (Example IV); and decreased to 15 parts (Example V). The results of these Examples are found to be generally comparable to the results of Example I. The bond between the dissimilar synthetic polymeric layers is found to be strong and permanent and to resist delamination very well.

EXAMPLE VI

The procedures described in Example I are followed substantially as set forth therein with the exception that the Oxyester T 1136 (V) is replaced by an equivalent amount of Teracol 650, a polytetramethylene polyether glycol, molecular weight 650, hydroxyl number 173, acid number 0.05 max.

The results of this Example are found to be generally comparable to the results obtained in Example I. The bond between the vinyl resin layer and the acrylated polyurethane resin layer is tested and is found to be strong and permenent and to resist delamination very well. Primary chemical bonds exist between the two dissimilar synthetic polymeric layers.

EXAMPLE VII

The procedures described in Example I are followed substantially as set forth therein with the exception that the Oxyester T 1136 (V) in the wear layer is replaced by an equivalent amount of Pluracol PeP 450, a polyether tetrol, molecular weight 400, hydroxyl number 560, acid number 0.05 maximum.

The results of this Example are found to be generally comparable to the results obtained in Example I. The bond between the vinyl resin wear layer and the acrylated polyurethane top surface coating is tested and is found to be strong and permanent and to resist delamination very well. Primary chemical bonds exist between the two dissimilar synthetic synthetic polymeric layers.

EXAMPLE VIII

The procedures described in Example I are followed substantially as set forth therein with the exception that the acrylated polyurethane top coating composition has the following formulation:

|  | Grams |
| --- | --- |
| Acrylated urethane oligomer | 80 |
| Tetraethylene glycol diacrylate | 10 |
| 2-ethylhexyl acrylate | 15 |
| Vicure-10 (isobutyl ether of benzoin) photoinitiator | 3% |
| (Free available NCO = 1.93%) | |

The results of this Example are generally comparable to the results of Example I. The bond between the dissimilar synthetic polymeric materials is strong and permanent. Delamination is found to be resisted successfully.

EXAMPLE IX

The procedures described in Example I are followed substantially as set forth therein with the exception that the acrylated polyurethane top coating composition has the following composition:

|  | Grams |
| --- | --- |
| Acrylated urethane oligomer | 80 |
| 1,6-hexanediol diacrylate | 10 |
| 2-ethylhexyl acrylate | 8 |
| Vinyl acetate | 7 |
| Vicure-10 (isobutyl ether of benzoin) photoinitiator | 3% |
| (Free available NCO = 1.9% | |

The results of this Example are generally comparable to the results of Example I. The bond between the dissimilar synthetic polymeric materials is strong and permanent. Delamination is resisted very well.

EXAMPLE X

The procedures described in Example I are followed substantially as set forth therein with the added definition that the acrylated urethane oligomer in the top coating composition is derived from Hylene W methylene-bis(4-cyclohexylisocyanate),Teracol 650 polytetramethylene ether glycol, and hydroxyethyl methacrylate. The results are satisfactory and are generally comparable to the results obtained in Example I. (Free, available NCO=2%)

EXAMPLE XI

The procedures described in Example I are followed substantially as set forth therein with the added definition that the acrylated urethane oligomer in the top coating composition is derived from Hylene W methylene-bis(4-cyclohexylisocyanate), Teracol 650 polytetramethylene ether glycol, and hydroxyethyl acrylate. The results are satisfactory and are generally comparable to the results obtained in Example I. (Free, available NCO=3%)

EXAMPLE XII

The procedures described in Example I are followed substantially as set forth therein with the added definition that the acrylated urethane oligomer in the top coating composition is derived from Hylene W methylene-bis(4-cyclohexylisocyanate), Plural 450 Tetrol polyoxyalkylene polyol based on pentaerythritol, and hydroxypropyl acrylate. The results are satisfactory and are generally comparable to the results obtained in Example I. (Free, available NCO=4%) All free, available NCO percentages cited in this Example and in all other Examples refer to the free, available NCO in the top surface coating composition.

EXAMPLE XIII

The procedures described in Example I are followed substantially as set forth therein with the exception that the acrylated polyurethane top coating composition is replaced by a conventional polyurethane top coating composition wherein the polyurethane is derived from Hylene W methylene-bis(4-cyclohexylisocyanate) and Teracol 650 polytetramethylene ether glycol. Curing takes place at an elevated temperature of about 385° F. for 2 minutes and 45 seconds. The results are satisfactory and are generally comparable to the results obtained in Example I. (Free, available NCO=2%)

EXAMPLE XIV

The procedures described in Example I are followed substantially as set forth therein with the exception that the acrylated polyurethane top coating composition is replaced by a conventional polyurethane top coating composition wherein the polyurethane is derived from isophorone diisocyanate (3-isocyanatomethyl-3,5,5-trimethylcyclohexyl isocyanate) and Pluracol 650 Tetrol polyoxyalkylene polyol based on pentaerythritol. Curing takes place at about 385° F. for 2 minutes and 45 seconds. The results are satisfactory and are generally comparable to the results obtained in Example I. (Free, available NCO=5%)

EXAMPLE XV

The procedures described in Example X are followed substantially as set forth therein with the exception that the Hylene W methylene-bis(4-cyclohexylisocyanate) in the top coating formulation is replaced by trimethyl hexamethylene diisocyanate. The results are satisfactory and are generally comparable to the results obtained in Example X. (Free available NCO=2%) Although several specific working Examples of the inventive concept have been described in particularity, the same should not be construed as limitative of the invention but as merely illustrating specific materials and procedures which are preferred and typical. Other materials and procedures may be used, as well as other equivalent features and aspects, without departing from the scope and the spirit of the appended claims.

What is claimed is:

1. A multi-layered construction of dissimilar synthetic polymeric materials comprising a first layer of synthetic polymeric material containing a vinyl resin, at least one plasticizer for said vinyl resin and from about 0.5 to about 20% by weight a chemical compound containing reactive hydrogen selected from the group consisting of hydroxy, carboxy, amido, amino, imino and mercapto; and a second layer of synthetic polymeric material containing a member of the group consisting of polyurethane and acrylated polyurethane compositions, containing from about 0.5% to about 10% by weight of a free available isocyanate, said two layers of synthetic polymeric materials being bonded in a strong and permanent primary chemical bond therebetween by a reaction product of said chemical compound containing reactive hydrogen and said polyurethane or acrylated polyurethane composition.

2. A multi-layered construction as defined in claim 1 wherein said chemical compound containing reactive hydrogen is a polyhydroxy compound.

3. A multi-layered construction as defined in claim 1 wherein said polyurethane is the reaction product of methylene-bis(4-cyclohexylisocyanate) and polytetramethylene ether glycol.

4. A multi-layered construction as defined in claim 1 wherein said polyurethane is the reaction product of trimethyl hexamethylene diisocyanate and polytetramethylene ether glycol.

5. A multi-layered construction as defined in claim 1 wherein said polyurethane is the reaction product of isophorone diisocyanate and a tetrol polyoxyalkylene polyol based on pentaerythritol.

6. A multi-layered construction as defined in claim 1 wherein said chemical compound containing reactive hydrogen is a polyester-type polyol.

7. A multi-layered construction as defined in claim 1 wherein said chemical compound containing reactive hydrogen is a poly-ether-type polyol.

8. A multi-layered construction of dissimilar synthetic polymeric materials comprising a first synthetic polymeric material containing a vinyl resin and at least one plasticizer for said vinyl resin; and a second synthetic polymeric material containing a member of the group consisting of polyurethane and acrylated polyurethane compositions, said synthetic polymeric materials being bonded in a strong and permanent primary chemical bond therebetween by a reaction product of a first synthetic polymeric material containing a vinyl resin, at least one plasticizer for said vinyl resin, and from about 0.5 percent by weight to about 20 percent by weight of a chemical compound containing reactive hydrogen; and a second synthetic polymeric material containing a member of the group consisting of a polyurethane or acrylated polyurethane composition and containing from about 0.5 percent by weight to about 10 percent by weight of free available isocyanate capable of reacting with said chemical compound containing reactive hydrogen in said first synthetic polymeric material.

9. A method of improving the bond between a vinyl resin material and a member of the group consisting of polyurethane and acrylated polyurethane resin materials which comprises: including from about 0.5 percent by weight to about 20 percent by weight of a chemical compound containing reactive hydrogen in said vinyl resin material; providing from about 0.5 percent by weight to about 10 percent by weight of free available isocyanate in said polyurethane and acrylated polyurethane resin materials; bringing said vinyl resin material and said polyurethane and acrylated polyurethane resin materials into contact; and exposing said vinyl resin material and said polyurethane and acrylated polyurethane resin materials to curing conditions, whereby there is sufficient chemical inter-reaction between said resin materials as to create a strong and permanent primary chemical bond therebetween, in addition to any hydrogen bonds or van der Waals forces.

10. A method as defined in claim 9 wherein a polyurethane resin material is used and curing conditions take place at elevated temperatures of from about 260° F. to about 410° F. for a period of time of from about 1 minute to about 8 minutes.

11. A method as defined in claim 9 wherein an acrylated polyurethane resin material is used and curing conditions take place by means of radiation curing.

12. A method as defined in claim 11 wherein an acrylated polyurethane resin material is used and curing conditions take place by means of mercury vapor arc radiation curing.

13. A multi-layered construction as defined in claim 1 wherein said vinyl resin is polyvinyl chloride.

14. A method as defined in claim 11, wherein an acrylated polyurethane resin material is used and curing conditions take place by means of medium pressure mercury vapor arc radiation curing.

15. A multi-layered construction as defined in claim 1 wherein said chemical compound has at least two reactive hydrogens attached in different sites.

16. A multi-layered construction as defined in claim 1 wherein said chemical compound has at least two reactive hydrogens.

17. A multi-layered construction as defined in claim 1, wherein said chemical compound is a polyol containing at least two reactive hydrogens.

18. A multi-layered construction as defined in claim 1 wherein said chemical compound is an ether-type polyol containing at least two reactive hydrogens.

19. A multi-layered construction as defined in claim 1, wherein said chemical compound is an ester-type polyol containing at least two reactive hydrogens.

20. A multi-layered construction as defined in claim 1, wherein said chemical compound is a polyamine containing at least two reactive hydrogens.

21. A multi-layered construction as defined in claim 1, wherein said chemical compound is a diamine containing at least two reactive hydrogens.

22. A multi-layered construction of dissimilar synthetic polymeric materials as defined in claim 1, wherein said acrylated polyurethane is derived from a diisocyanate, an ether-type polyol, and a hydroxyalkyl acrylate.

23. A multi-layered construction of dissimilar synthetic polymeric materials as defined in claim 1, wherein said acrylated polyurethane is derived from methylene-bis(4-cyclohexylisocyanate), an ether-type polyol, and hydroxyethyl acrylate.

* * * * *